United States Patent [19]
Bonaddio et al.

[11] 3,880,029
[45] Apr. 29, 1975

[54] METHOD FOR GANGED SCORING OF GLASS

[75] Inventors: Robert M. Bonaddio, Monroeville; Laverne O. Parkhill, Lower Burrell, both of Pa.

[73] Assignee: PPG Industries, Inc., Pittsburgh, Pa.

[22] Filed: June 19, 1974

[21] Appl. No.: 480,806

Related U.S. Application Data

[62] Division of Ser. No. 390,446, Aug. 22, 1973.

[52] U.S. Cl. ............... 83/7; 83/11; 83/467; 83/520
[51] Int. Cl. ............... B26d 3/08; C03b 33/04
[58] Field of Search ............... 83/6, 7, 11, 467, 520, 83/521

[56] References Cited
UNITED STATES PATENTS

| | | | |
|---|---|---|---|
| 2,510,471 | 6/1950 | Horstkotte | 83/520 X |
| 2,806,492 | 9/1957 | Becker | 83/520 |
| 3,253,756 | 5/1966 | Haley et al. | 83/6 X |
| 3,496,814 | 2/1970 | Bessim | 83/520 X |
| 3,537,344 | 11/1970 | Walsall et al. | 83/11 X |
| 3,707,999 | 1/1973 | Coats | 83/520 X |
| 3,777,602 | 12/1973 | Youra | 83/467 X |
| 3,813,979 | 6/1974 | Rich | 83/467 |

*Primary Examiner*—Frank T. Yost
*Attorney, Agent, or Firm*—Dennis G. Millman

[57] ABSTRACT

Ganged scores are made in two directions on a sheet of glass in order to subdivide it into a plurality of small pieces. Interchangeable scoring tool holders are utilized to adapt the apparatus to different score spacings. Scoring pressure can be varied on each scoring tool individually or simultaneously on all scoring tools in a gang. Means for projecting a visual image is provided to aid accurate alignment of a patterned sheet of glass.

4 Claims, 7 Drawing Figures

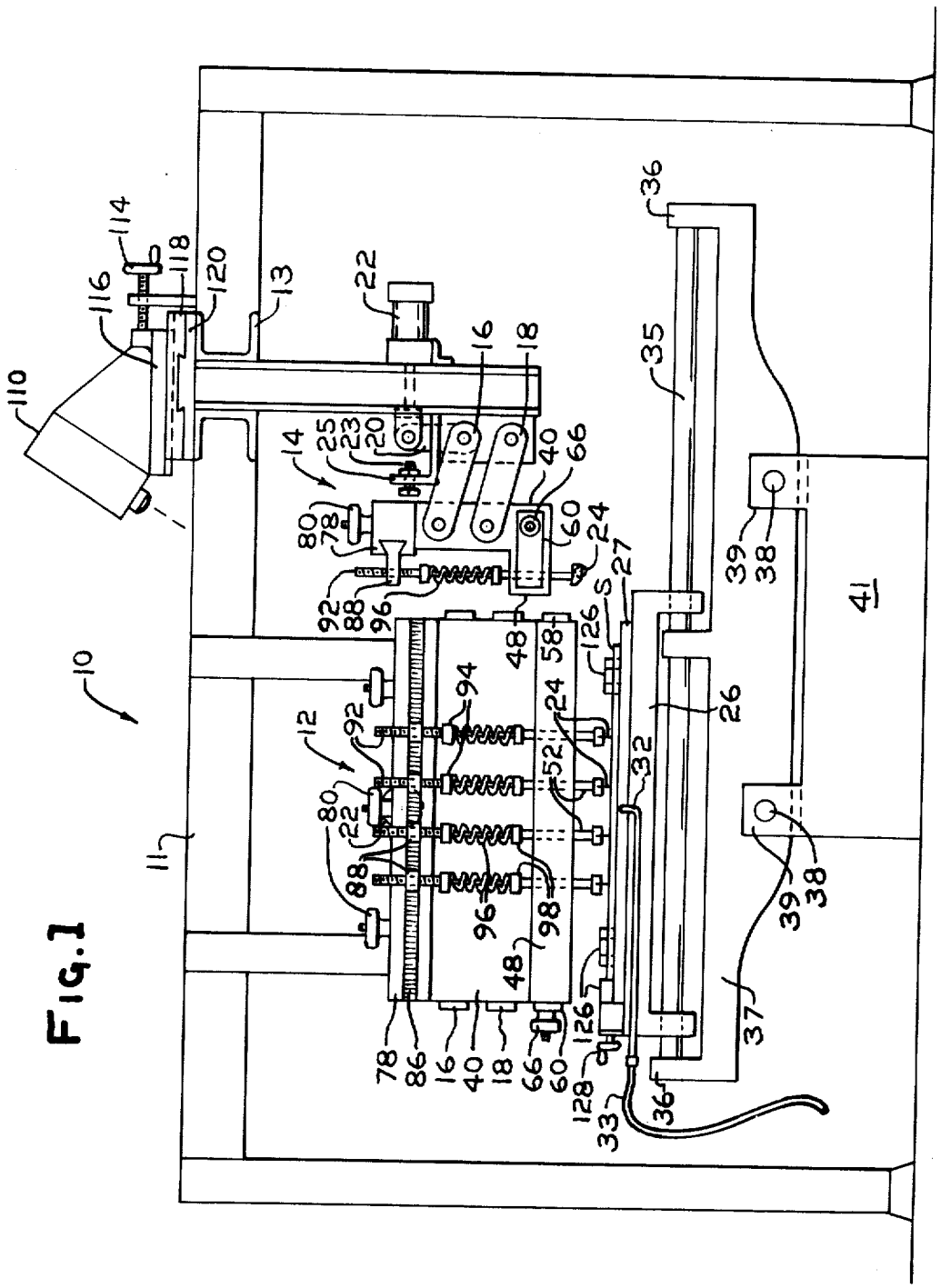

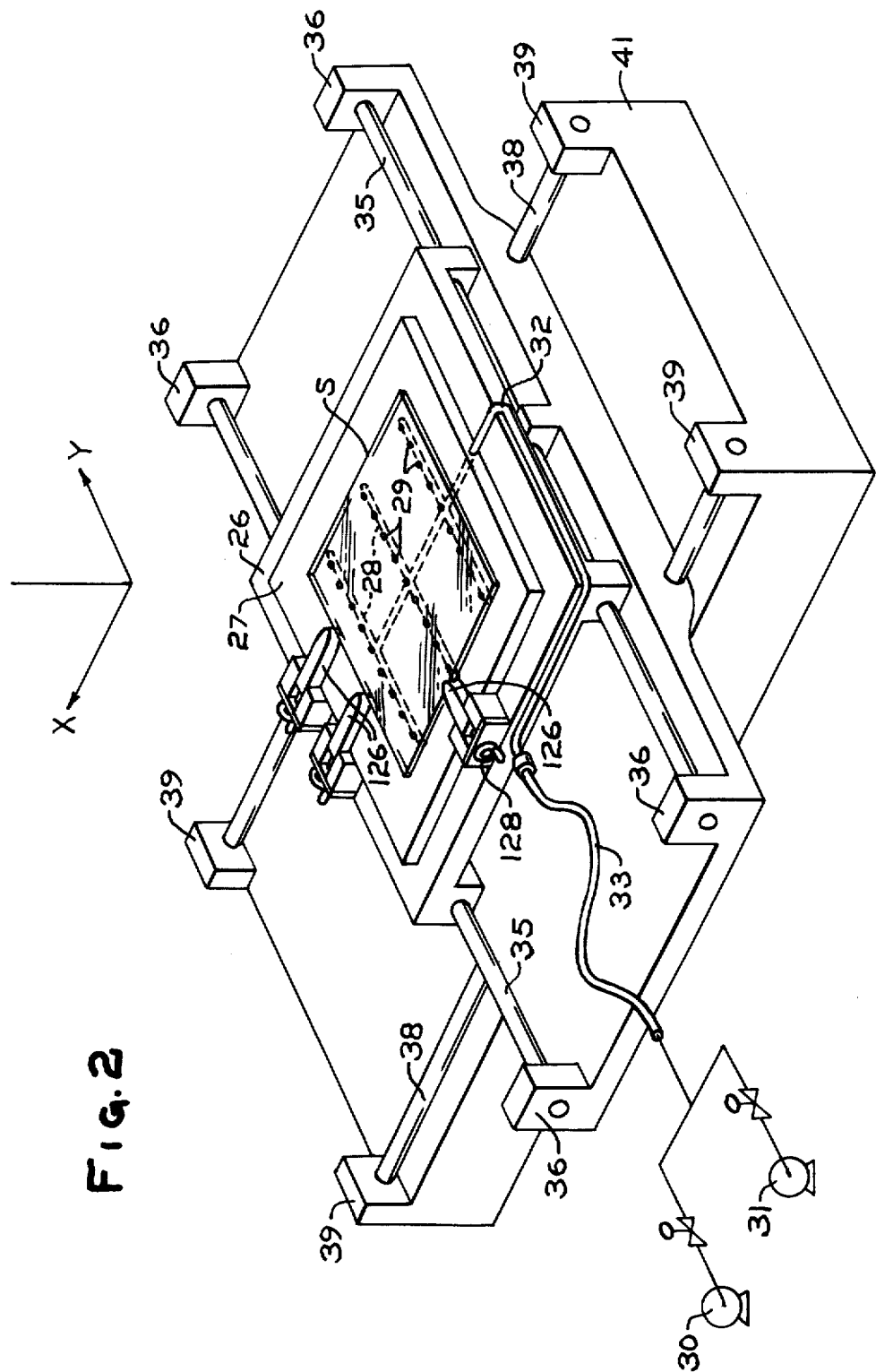

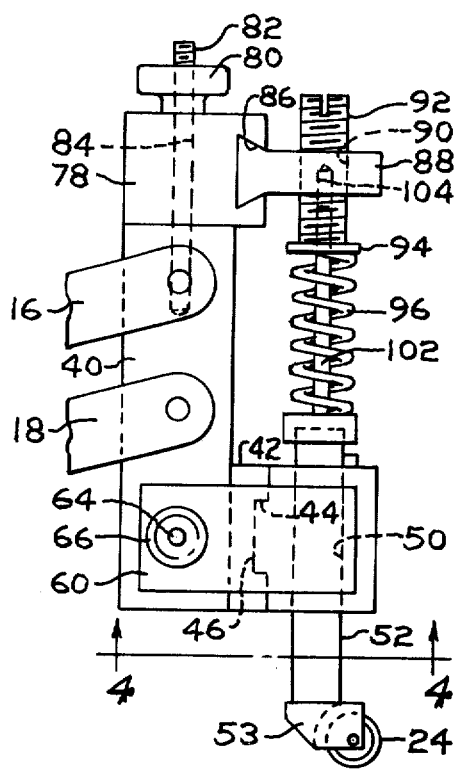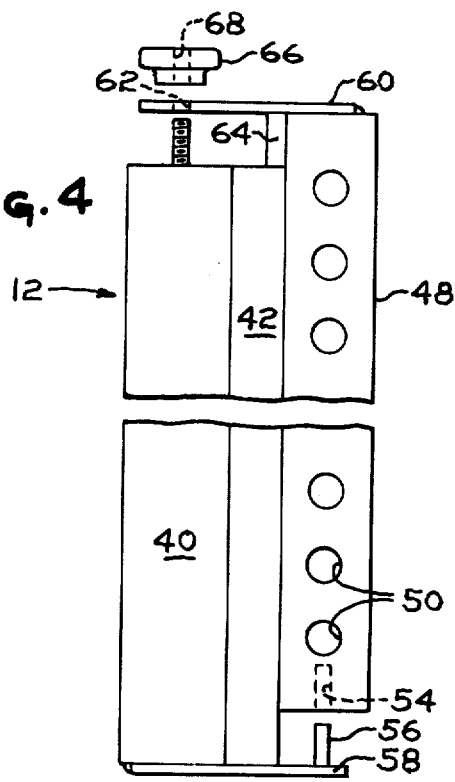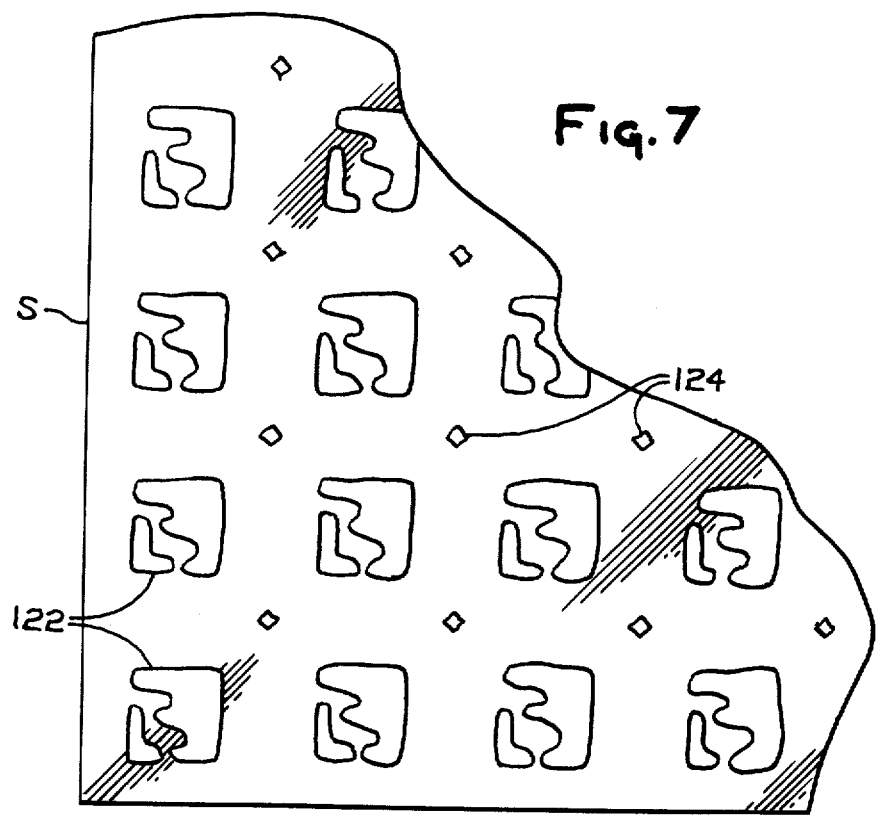

METHOD FOR GANGED SCORING OF GLASS

This is a division of application Ser. No. 390,446, filed Aug. 22, 1973.

BACKGROUND OF THE INVENTION

This invention relates to an apparatus for cutting glass and the operation of the apparatus, and more particularly, to the scoring of glass sheets preparatory to breaking them into small rectangles or squares.

The type of glass cutting to which this invention is directed involves making a physical discontinuity, or score, on the surace of a sheet of glass or near the surface or both, followed by the application of a bending moment about the score line to snap the glass along the score line. The present invention is directed to an improvement in the method and means for placing the scores on a sheet of glass in the particular case of a relatively large sheet being subdivided into a large number of small pieces.

The prior art has advanced from the time-consuming practice of manually making each score individually to the use of ganged sets of scoring tools which simultaneously make a plurality of parallel scores in a single pass. The various ganged scorers in the prior art possess certain disadvantages, however, which affect their precision and versatility. The following U.S. pats. show typical prior art ganged scorers:

No. 2,377,098 - Owen -May 29, 1945
No. 3,151,794 - Brand - Oct. 6, 1964
No. 3,286,893 - Zellers - Nov. 22, 1966
No. 3,537,344 - Nixon, et al., - Nov. 3, 1970
No. 3,626,795 - White - Dec. 14, 1971
No. 3,716,176 - Yamada, et al., - Feb. 13, 1973

The device shown in the Yamada, et al., patent makes no provision for changing the spacing of the scoring tools. Thus if it is desired to cut pieces having slightly different dimensions, it would be necessary to rebuild a substantial portion of Yamada, et al.'s, machine. Since production runs on a given size can be relatively short, such an arrangement would be highly impractical.

The remaining prior art devices cited above do provide means to change the score spacings, but only with a substantial loss of precision. Each of the devices includes a plurality of individual scoring tool holders, each of which is laterally adjustable. As a result, the location of each scoring tool must be individually determined every time a new spacing is set up, a cumbersome and imprecise procedure.

It is known in the prior art to provide each scoring tool with means to adjust the pressure thereon so that the tools will produce uniform scores. When different thicknesses of glass are used or when a different depth of score is desired, it often becomes necessary to change the pressure on all the scoring tools. With the prior art devices, such a change entails tediously adjusting the pressure on each tool separately while attempting to maintain the pressures uniform, a time-consuming trial-and-error process.

An area in which the present invention has been found to be particularly useful is in the process where a large number of discrete, electrically conductive patterns are coated onto a sheet of glass, and the sheet is subsequently subdivided into small rectangles with a pattern accurately located on each rectangle. Typical tolerance requirements for the cut products of this type are on the order of ± 0.010 inch, and sometimes as small as ± 0.008 inch. For this type of work, not only must the spacing of the scoring tools be very accurate, but also the patterned glass sheet itself must be very precisely aligned with the cutting tools. None of the prior art devices provide means with which such a coated pattern can be accurately aligned with the scoring tools.

SUMMARY OF THE INVENTION

The present invention overcomes the disadvantages of the prior art by providing an arrangement that is adaptable to a wide variety of scoring situations without sacrificing accuracy.

The apparatus is comprised of a table moveable in two horizontal directions so that a glass sheet received thereon can pass under each of two banks of scoring tools that are suspended from stationary overhead bridges located perpendicularly to each other. Means are provided for biasing each bank of scoring tools as a whole toward the surface of the glass with a pressure that can be varied. Additionally, each individual scoring tool has associated with it an adjustable spring biasing means, so that the pressure on each scoring tool can be varied independently from the main biasing means.

Each bank of scoring tools is held on a unitary guide means having a plurality of accurately machined bores therein for receiving the shafts of the scoring tools. The guide means is releasably locked into position, so that it can be quickly detached and another guide means having a different array of bores inserted in place thereof. In this manner the spacing of the scores can be changed in one simple step that requires no measuring or re-adjusting.

An additional aspect of the invention provides means for accurately aligning the spaces between patterns on a coated sheet of glass with the path of the scoring tools. Included are a projector which focuses a cross hair image onto the glass-receiving table and a set of adjustable stop means on the table. In use, a set of trial scores are made and the projector adjusted so that the cross hairs are superimposed on the scores. The patterned sheet can then be aligned using the cross hair projection as a guide and the stops set for that alignment. The stops alone are then used for aligning subsequent sheets having the same size and patterns.

An understanding of the construction of the apparatus and the method used in this invention may be gained from the specification read in conjunction with the drawings wherein:

FIG. 1 is a side view of the overall apparatus;

FIG. 2 is a perspective view of the moveable glass support means;

FIG. 3 is an end view of one scoring frame;

FIG. 4 is a bottom view, partly broken away, of the scoring frame shown in FIG. 3 with the scoring tool shafts removed;

FIG. 7 is a plan view of a patterned sheet of glass to be scored.

DETAILED DESCRIPTION OF THE PREFERRED EMBODIMENT

Figure 5:
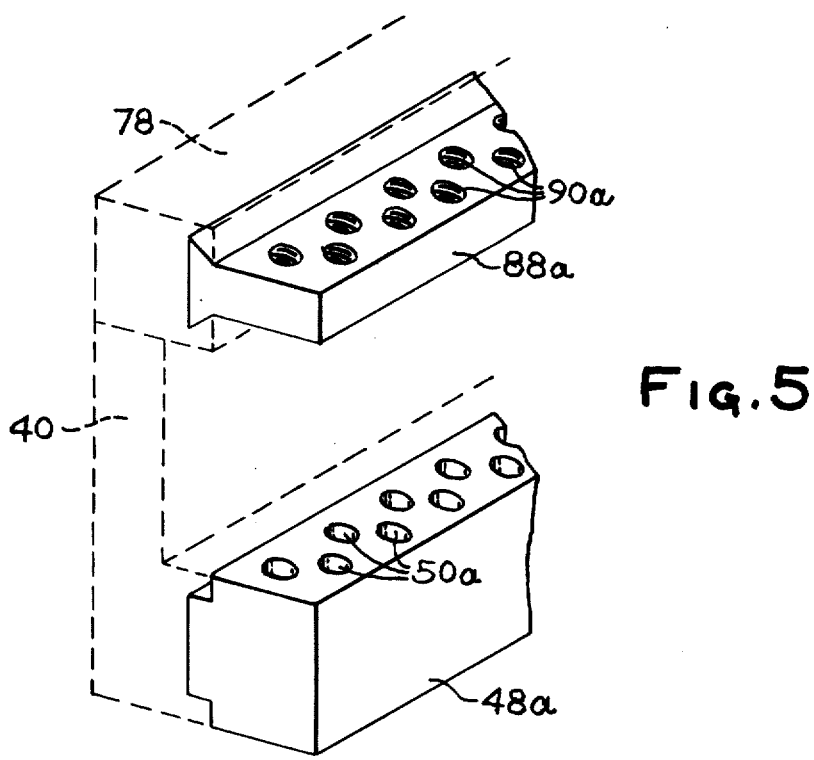
FIG. 5 is a perspective view, partly broken away and partly in phantom, of an alternate arrangement of a scoring frame.

Referring to FIG. 1, a preferred embodiment of the invention is shown wherein a stationary bridge structure 10 rigidly supports two scoring frames shown generally as 12 and 14 positioned ninety degrees to each other. The bridge structure could take any suitable form, such as a cantilevered beam or part of a building structure, the structure 10 shown in FIG. 1 being merely exemplary.

Beam 11 supports scoring frame 12, and crossbeam 13 is cantilevered so as to support scoring frame 14 generally forward of frame 12 as viewed in FIG. 1. Each scoring frame is independently vertically moveable by means of link rods 16 and 18, wherein rod 16 is power-driven by cylinder 22 by way of pivot bar 20 which is mounted on a common shaft with rod 16. Such vertical movement permits a plurality of scoring tools 24 held by the scoring frames to be retracted from the surface of the sheet of glass S held on table 26 to be pressed against the surface of the glass at a preselected pressure to effect the scoring. In FIG. 1, frame 12 is shown in the lowered position and frame 14 is in the retracted position. Both scoring frames are provided with limit means 23 which are threaded through brackets 25 to contact pivot rods 20 when each pivot rod is moved forward, thereby limiting its forward travel. By adjusting the limit means, the distance the frame will be lowered can be varied and the pressure on the scoring tools will accordingly be varied uniformly. In this manner a preselected pressure can be accurately reproduced on every sheet of glass scored during a given production run. Another resulting advantage is that only one adjustment is needed to change the scoring pressure of the entire bank of scoring tools held on a scoring frame, rather than adjusting each scoring tool individually and thereby introducing unwanted pressure variations between tools on the same frame.

Table 26 has a smoothly finished face plate 27 affixed to its top surface. As shown in FIG. 2, the underside of face plate 27 is provided with a network of airtight, interconnecting channels 28 which can be put in communication with either a vacuum source 30 or a pressure source 31 (both shown schematically) by way of pipe 32 and flexible conduit 33. The upper surface of face plate 27 has a plurality of small holes 29 that extend to the channels. When a sheet of glass S is positioned on the table and ready for scoring, the vacuum source is activated, causing the sheet to be drawn to the surface of the face plate with sufficient force to hold it in place during the scoring operation. When placing the glass sheet onto the table and when removing it, the positive pressure source is activated to cause the sheet to "float" on a thin layer of air between the sheet and the surface of the plate. In this manner the sheet can be loaded and unloaded with minimum physical contact which might mar the glass or a coating on the glass.

Referring to FIGS. 1 and 2, table 26 is slideably mounted on guide rods 35 supported at each end by blocks 36 which are fixed to saddle 37. Saddle 37 is mounted for sliding in the transverse direction on guide rods 38 which are supported at each end by blocks 39 fixed to base 41. Any suitable drive means may be utilized to propel the table and saddle in their respective directions. A suitable arrangement has been found to be the provision of hydraulic cylinder means (not shown) supported on the saddle and connected to the table on its underside, and another cylinder (not shown) on the base connected to the underside of the saddle. A suitable table, saddle, and base, as well as their motive means, are commercially available as the "30 × 20 Spacer Table" made by the Bullard Company, Bridgeport, Conn., and form no part of the present invention in themselves. It should be apparent that the arrangement disclosed permits the glass sheet S positioned on table 26 to be passed beneath the first scoring frame 12 (in what will be referred to as the X direction) by propelling the saddle 37, and subsequently beneath the second scoring frame 14 (the Y direction) by propelling table 26.

Details of scoring frame 12 may be seen in FIG. 3. The other scoring frame 14 may be identical, but is advantageously a mirror image of frame 12 as shown in FIG. 1 so as to be more accessible during changeover operations, as will be made apparent below. Also, the lengths of the frames need not be the same, but may be adapted to the length and width of the largest sheets to be scored.

Each scoring frame has a main body 40 pivotally attached at both ends to a pair of link rods 16 and 18. From the lower front end of main body 40 extends a bracket 42 having a groove 44 adapted to receive the tongue 46 of shaft guide 48. Shaft guide 48 extends the full width of the scoring frame and includes a plurality of spaced bores 50 for receiving the shafts 52 holding the scoring tools 24. The scoring tools themselves can be any type of scoring wheel known in the art, many of which are commercially available. A ball bearing swivel connection is usually provided between a skirt 53 and shaft 52 in scoring wheels of this type. It should be apparent that the invention could be adapted to utilize other known scoring tools, such as diamond or hardened steel styli, and that the tolerances of the scoring tools themselves will affect the overall accuracy of the apparatus. The greatest accuracy has been achieved with precision-made scoring wheels.

Referring to FIG. 4, shaft guide 48 includes a bore 54 at one end to receive pin 56, which projects from end plate 58 affixed to main body 40. To the opposite end of shaft guide 48 is affixed end plate 60 which has a hole 62 of slightly larger diameter than threaded pin 64. Knurled knob 66 has a center bore 68 threaded to screw onto pin 64 so as to lock shaft guide 48 into place on the scoring frame.

Figure 6:
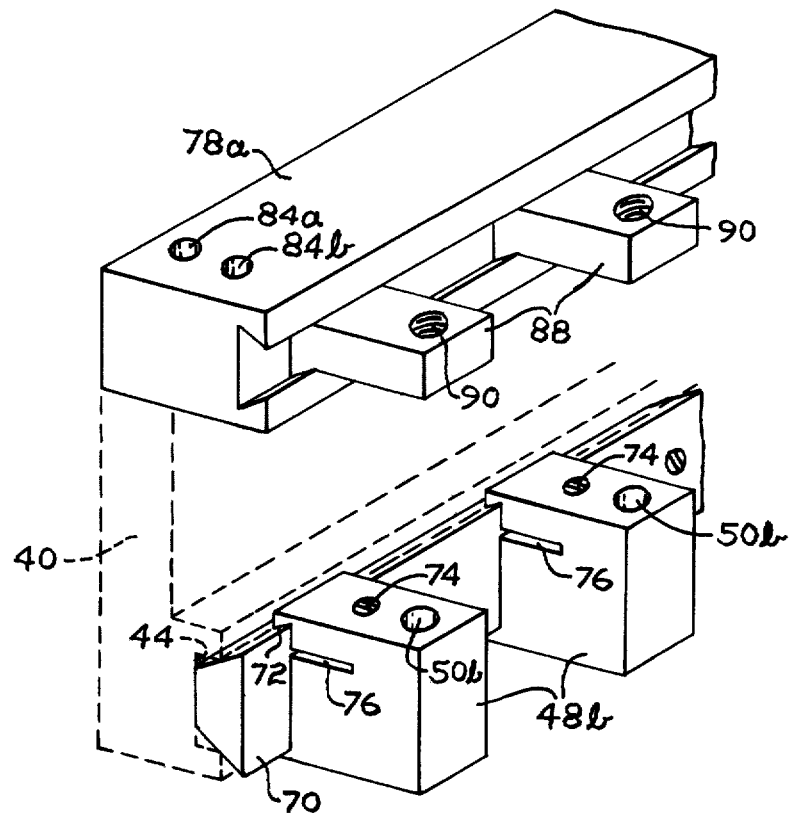
FIG. 6 is a perspective view, partly broken away and partly in phantom of another alternate arrangement of a scoring frame.

In this manner any number of shaft guides having different bore spacings may be provided and quickly substituted on the scoring frame with no loss of accuracy. One such variation can be seen in FIG. 5 where shaft guide 48a has been adapted to making very narrowly spaced scores by staggering the bores 50a in a guide of increased width. Another adaptation is shown in FIG. 6 where groove 44 has been fitted with a dovetail adapter bar 70, permitting the use of a plurality of individual shaft guides 48b, each having a single bore 50b for receiving a scoring wheel shaft. Each shaft guide 48b has a dovetail groove 72 which allows the guide to be slideably retained on the dovetail bar 70. Tightening screw 74 causes compression of cut 76, causing the shaft guide 48b to become locked in position on the dovetail bar. Thus, one set of shaft guides 48b can be used to "customize" almost any scoring spacing, with no machining being required. This latter variation (FIG. 6), however, does not lend itself to the high degree of precision achieved with the other embodiments.

Referring again to FIG. 3, upper block 78 is releasably fastened to the top of main body 40 by means of knurled knob 80 which is threaded onto shaft 82. Shaft 82 anchored in main body 40 and is slip-fitted through bore 84 in upper block 78. Dovetail groove 86 running, along the front of upper block 78 is adapted to receive the dovetailed end of retainer 88. Retainer 88 has a threaded bore 90 in axial alignment with bore 50 in lower guide 48 adapted to receive spring adjusting screw 92. Retainer 88 may take the form of a plurality of individual pieces, each having a single bore 90, as shown in FIGS. 1 and 6, or it may take the form of a single piece such as 88a shown in FIG. 5. The embodiment shown in FIG. 5 is for the special case of making very closely spaced scores, wherein the retainer 88a must be a single piece provided with extra width to accommodate the staggered bores. It should be apparent that a single piece retainer could be made with whatever width and bore spacings are needed to align with any arrangement of bores 50 that would be encountered in any of the interchangeable shaft guides 48. But since lateral alignment of the retainer has been found not to have a significant effect on scoring accuracy, it is preferred to use the adaptable plural individual retainers 88 in most cases. The appropriate number of retainers are slid into groove 86 from the end thereof and spaced along the groove so as to align the bores 90 with bores 50.

FIG. 6 shows a modification of upper block 78 for adapting the use of individual retainers 88 with individual shaft guides 48b. Because shaft guides 48b are provided with groove 72 and clamping means 74 and 76, the bore 50b is spaced farther from main body 40 than usual. Therefore, in order to put bores 90 in alignment with bores 50b, a wider upper block 78a is provided in order to locate retainers 90 farther forward. In the forward position, upper block 78a would be mounted with threaded shaft 82 extending through bore 84a. If it is desired, the same upper block can be used in both the forward and normal positions by providing additional bores 84b in upper block 78a so that shaft 82 can be inserted through 84b in the normal position.

Spring adjusting screw 92 terminates at its lower end with a shoulder 94 which engages the upper end of spring 96. The lower end of spring 96 is biased against cap 98 which has a pocket 100 to receive the upper end of scoring wheel shaft 52 in a slip-fit relationship. Centering shaft 102 is fastened to cap 98 at its lower end, and at its upper end is slip-fitted into bore 104 in adjusting screw 92. Bore 104 is of sufficient length to permit vertical travel of shaft 102 when spring 96 is compressed. Pin 106 extends from the side of scoring wheel shaft 52 to prevent the shaft from dropping out of bore 50 when the scoring frame is in the retracted position. A keyway (not shown) is provided in bore 50 through which pin 106 will pass when shaft 52 is rotated to bring the pin into alignment with the keyway, thereby permitting removal of shaft 52 from bore 50 when it is desired to change scoring wheels or when the scoring wheels are being transferred to a different shaft guide.

When scoring wheel 24 is pressed against the surface of a sheet of glass by lowering scoring frame 12, shaft 52 will rise in bore 50 against the compression of spring 96. The more the frame is lowered, the greater the compressional force of the spring will be on shaft 52. By varying the distance the frame is lowered, the force on each scoring wheel on the frame can be controlled uniformly and simultaneously. Additionally, the compression of each spring can be individually changed by turning adjusting screw 92. In this way non-uniformities arising, for example, from tolerance variations in machined parts, irregularities in the springs, and varying degrees of wear on the scoring wheels can be compensated for in order to produce uniform scores across the width of the sheet.

In order to facilitate the alignment of the glass sheet to be scored on table 26, there is provided a projector 110 as shown in FIG. 1. The projector is shown mounted on beam 13 extending from bridge 10, but the location and mounting of the projector is not critical, so that any convenient mounting may be provided to suit the layout of a particular installation. The projector must, however, have an unobstructed path of projection to the approximate center of table 26 when the table is in a conveniently reproducible location, such as the loading position. In FIG. 1, the table is in its loading position when completely extended to the left with saddle 32 moved completely forward. In the embodiments shown in FIG. 1, the projector is located beyond the edge of the table and angled back toward the center of the table in order to avoid shadowing by the operator, who would normally be leaning over the table in order to view the patterned sheet from directly above during the aligning step.

Projector 110 is merely the commercially available type generally used to show slide transparencies in the home, modified only to the extent that the automatic slide changing mechanism has been disconnected.

In utilizing the projector, scores are made on a blank sheet of glass in the X and Y directions, and with the table again in the loading position, a pair of intersecting cross hairs are projected onto the table parallel to the two directions of table travel and the projector is adjusted to superimpose the cross hair projections onto a convenient pair of intersecting scores. Convenient scores for this purpose would be the center scores or a pair of end scores. Crank means 114 is provided on the projector for adjusting it parallel to the direction of table travel by sliding base 116 relative to base 118. Similar means (not shown) are provided for adjustment of the projector in the transverse direction by sliding base 118 relative to base 120. The blank sheet can then be removed and patterned sheet S placed on the table. The sheet has coated patterns 122 thereon as shown in FIG. 7. By aligning the spaces between the patterns with the cross hair projections, the desired scoring path can be readily and accurately established. It has been found that accuracy can be further improved by providing small guide marks 124 along the centers of the spaces between the patterns, with which the cross hair projections can be aligned. The marks 124 are placed on the glass sheet in the same coating operation that makes the patterns 122.

Three stop means 126 (FIGS. 1 and 2) are provided along the periphery of table 26 and extending over face plate 27. The stops are threaded to screw shafts (not shown) so that the stops are extended onto the face plate by turning cranks 128. Each screw shaft is provided with a set screw to lock the stop in a given position. When the first patterned sheet has been aligned with the cross hair projections, the stops 126 are extended to contact the edges of the sheet and locked in place. Subsequent sheets having the same pattern can then be aligned by merely sliding them up to the stops.

Once the settings of stops 126 have been established using the projector as detailed above, the scoring machine is ready to begin operation. Positive pressure is supplied to the surface of table 26 through holes 29 and a sheet of patterned glass S is floated into position in abutment with stops 126. The pressure mode is then switched to vacuum to lock the sheet in place. During this loading operation the table 26 is in the far left position as viewed in FIG. 1 and saddle 27 is in the extreme forward position. With both scoring frames 12 and 14 in the raised position, saddle 37 is moved to the rear position, carrying the table past scoring frame 12. Scoring frame 12 is then lowered to bring the scoring wheels 24 into contact with the edge of the sheet under a predetermined pressure. As saddle 32 returns to the forward position, the scores in the X direction are effected. Scoring frame 12 is raised when the trailing edge of the sheet approaches the scoring wheels. Table 26 is then moved to the right and scoring frame 14 lowered onto the edge of the sheet to effect the scores in the Y direction. Scoring frame 14 is then raised, and the surface of the table again pressurized to float the glass for unloading. The sheet can be conveyed to the right as viewed in FIG. 1 to a snapping station of any suitable type and the severing completed there. Table 26 is then returned to the left to receive another sheet of glass.

When one production run has been completed, and it is desired to score sheets having different sized patterns, the machine can be easily adapted to the new pattern with very little lost production time. Knobs 80 are unscrewed to allow upper block 78 to be raised, thereby releasing the ends of the scoring wheel shafts 52 from caps 98. Knob 66 is then unscrewed so that shaft guide 48 may be removed. The appropriate number of scoring wheels are transferred to another shaft guide having different bore spacings, and the new guide is slid into groove 44 and locked into place by tightening knob 66. Retainers 88 are slid laterally to bring the caps 98 into alignment with the ends of shafts 52. Retainers may be added or removed by sliding them out the end of dovetail groove 86 in the upper block in order to provide the same number of retainers as there are scoring wheels.

It should be apparent that the operation of each scoring cycle could be automated using standard control means known in the art. Trip-switches could be provided to be activated by contact with the moving table at strategic locations to trigger the lowering and raising of the scoring frames and the movements of the table and saddle in accordance with the operating sequence set forth above.

The preferred construction and operation of the invention has been explained and is considered to represent a desirable embodiment. It should be understood that within the scope of the appended claims the invention may be practiced otherwise than as specifically illustrated and described.

We claim:

1. A method for scoring glass along a precisely determined path of intended cut comprising:

projecting a visual image onto a scoring table, which image corresponds to the fixed path of a scoring means, placing a trial piece of glass on the table, scoring said trial piece while locked in place on the table, aligning the projected visual image to superimpose the image on the resulting scores on the trial piece, removing the trial piece, aligning a second piece of glass to be scored on the table so that the visual image is superimposed on the desired path of cut in said second piece of glass, locking said second piece of glass in the aligned position, and scoring said second piece of glass with said scoring means.

2. A method according to claim 1 whereby the scoring is performed in two intersecting directions, said visual image being correspondingly two-dimensional so as to enable alignment in both directions.

3. A method according to claim 1 wherein said second piece of glass is a sheet having a plurality of discrete patterns thereon which are to be separated on individual cut pieces of the sheet, each pattern being accurately located on a cut piece.

4. A method according to claim 1 including the additional step of:

extending mechanical stop means to contact at least two edges of said second piece of glass while the glass is locked in the aligned position, whereby subsequent identical pieces may be aligned using the stop means alone.

* * * * *